United States Patent [19]

Hiller

[11] Patent Number: 4,907,103

[45] Date of Patent: Mar. 6, 1990

[54] LOW $CNO_2$ LOADING, HIGH COERCIVITY THERMOMAGNETIC TAPE DUPLICATION

[75] Inventor: Dale M. Hiller, Wilmington, Del.

[73] Assignee: Otari Electric Company, Ltd., Japan

[21] Appl. No.: 3,164

[22] Filed: Jan. 14, 1987

[51] Int. Cl.$^4$ ............... G11B 5/02; G11B 5/86; G11B 5/78

[52] U.S. Cl. .................... 360/59; 360/134; 360/16

[58] Field of Search ............ 360/15, 16, 59, 134

[56] References Cited

U.S. PATENT DOCUMENTS

| | | | |
|---|---|---|---|
| 3,554,798 | 1/1971 | Nacci | 360/16 |
| 3,824,617 | 7/1974 | Kobayashi et al. | 360/16 |
| 3,844,907 | 10/1974 | Kitamoto et al. | 360/16 |
| 3,947,872 | 3/1976 | Asai | 360/16 |
| 4,568,619 | 2/1986 | Hiller | 360/134 |
| 4,631,602 | 12/1986 | Chouinard et al. | 360/16 |
| 4,698,701 | 10/1987 | Gantzhorn, Jr. et al. | 360/16 |

FOREIGN PATENT DOCUMENTS 0208471 1/1971 European Pat. Off. .............. 360/16

OTHER PUBLICATIONS

Dickens et al., "Thermoremanent Duplication of Magnetic Tape Recording", Journal of the SMPTE, Mar. 1971, vol. 80, No. 3.

Primary Examiner—Aristotelis M. Psitos
Assistant Examiner—Surinder Sachar
Attorney, Agent, or Firm—Flehr, Hohbach, Test, Albritton & Herbert

[57] ABSTRACT

An improved high speed process for thermomagnetic duplications of color video tapes employing, as the copy tape, tape having a chromium dioxide loading of approximately 10 to 60 mg/dm$^2$. Also a prerecorded tape made by the improved process.

3 Claims, No Drawings

LOW CNO₂ LOADING, HIGH COERCIVITY THERMOMAGNETIC TAPE DUPLICATION

FIELD OF INVENTION

This invention relates to thermomagnetic duplication of ferromagnetic chromium dioxide tapes and, more particularly, to an improved high speed process and copy tape for producing high quality prerecorded color video tapes.

STATE OF THE ART

Demand for prerecorded color video tapes has increased dramatically with the growing popularity of home video recording and playback equipment. Production of such tapes is exacting due to the large amount of information that must be recorded to faithfully reproduce the image and color of the master tape. Currently, the dominant method employed in the industry for this purpose involves the use of up to 1,000 recording machines having magnetic heads, all operating simultaneously in realtime, to reproduce the signal from one master playback machine. Recently, direct recording methods at twice the replay speed and anhysteretic processes, which have potential for high speed utility, have been introduced. While these have promise to minimize the equipment proliferation noted above, they have not received broad acceptance.

Thermomagnetic duplication has been proposed as an alternative method for the duplication of magnetic tapes, and particularly for preparation of ferromagnetic chromium dioxide copy tapes since chromium dioxide has a Curie temperature well suited for the process. In thermomagnetic duplication, the magnetic image contained on the master tape is duplicated on the magnetic copy tape (sometimes called the "slave" tape) by heating the copy tape above its Curie temperature, and then cooling the copy tape through its Curie temperature while maintaining intimate contact between the master and copy tapes. Since the material selected for use as the magnetic coating on the master tape has a significantly higher Curie temperature than that of the copy tape, the master tape magnetic image is not affected by the process. Thus, the master tape can be used repetitively and can be fashioned in a continuous loop to facilitate recycling through the process.

It is desirable to conduct thermomagnetic duplication at high speed in order to maximize the number of copies that can be obtained from one duplicating machine. U.S. Pat. No. 4,631,602 of Chouinard et al., for example, discloses a thermomagnetic duplication process capable of duplicating magnetic tapes at speeds typically in the range of 60 to 260 cm/sec. Notwithstanding the excellent results that may be obtained practicing the process disclosed by Chouinard et al., further improvements are desired in duplication speed and reduction of process cost.

SUMMARY OF THE INVENTION

Chromium dioxide tapes that are available for conventional color video recording typically employ chromium dioxide having a coercivity of approximately 530 to 600 oersteds, at a loading of approximately 60 to 80 milligrams of chromium dioxide per square decimeter of the tape surface, in order that quality color video recording may be prepared using a magnetic head. It now has been found that chromium dioxide tapes having lower chromium dioxide loading, as low as indeed approximately 10 to 30 mg/dm², provide excellent reproduction of magnetic color video images in a thermomagnetic duplication process although such thin coatings would be unsatisfactory for recording color video images through use of a conventional magnetic recording head. Selection of the loading levels provided by the invention does not adversely affect playback of the tape in conventional equipment. Conventional ferrite heads suffer from pole-tip saturation, so that additional write current does not produce the necessary additional recording field needed to direct-record on tape coated with high-coercivity particles; in contrast, TMD—relying only on thermal effects to achieve signal transfer—is not coercivity limited.

Since the coatings have substantially less mass than conventional tapes, it takes less time to heat and cool the tape, allowing higher duplication speeds to be achieved, or permitting use of a lower power heating source. It also has been found that use of these low levels of chromium dioxide loading result in a lower frequency of dropouts than is normally encountered in magnetic recording, for reasons that are not fully understood.

Accordingly, this invention provides an improved process for thermomagnetic duplication of color video tape, and a resulting improved prerecorded tape.

DETAILED DESCRIPTION OF THE INVENTION

Ferromagnetic chromium dioxide is widely used in the manufacture of magnetic tapes, and generally consists of acicular particles having a tetragonal crystal structure of the rutile type. The thermomagnetic duplication ("TMD") process does not impose the same recording penalties that conventional magnetic recording heads impose on selection of high coercivity chromium dioxide. Thus, chromium dioxide having a coercivity of at least 500 oersteds, and preferably 610 oersteds or higher, will be selected in practicing the invention to provide high quality color video images on playback.

Selection of particle size of the chromium dioxide is not as demanding as for conventional video tapes, which typically need fine grained particles to achieve high signal-to-noise ratio (S/N). In the case of widely-used cobalt-doped iron oxide particles, high-performance tapes use particles having a specific surface area in the 40–50 m²/g range. In the case of chromium dioxide, used in realtime, the comparable surface areas are somewhat lower because the crystals have more regular surfaces, but 38 m²/g crystals give higher S/N than the more commonly used video crystals at 30 m²/g. In all cases, the use of particles with high specific surface area poses special reformulation and processing problems to the tape manufactures. In the case of TMD, video quality has been unexpectedly found to be equally excellent for both crystal sizes of chromium dioxide, making it possible to use the familiar 30 m²/g particle size, which confers both technical and economic advantages.

The chromium dioxide particles are dispersed in an organic polymeric binder prior to being coated on the tape substrate. The organic binder may be any of the commercially available polymers commonly used in preparing magnetic tapes, including polymers prepared by addition or condensation polymerization. Representative binders include polyurethanes, epoxides, vinyl polymers, polyacrylic or polymethacrylic acids or esters thereof, polybutadiene, polycarbonates, polyvinylidene chlorides, nitrocellulose, cellulose esters, and mixtures thereof. Those skilled in the art can readily select an appropriate binder, from the large number of available polymers, that will give the desired combination of properties such as strength, elasticity, surface uniformity and smoothness.

One preferred binder is a soluble preformed polyester-polyurethane elastomer resin based on diphenylmethane diisocyanate, adipic acid, and an alkanediol having 2 to 4 carbon atoms. Other preferred binders include commercially available copolymers of vinylidene chloride with acrylonitrile, of butadiene with acrylonitrile, and of vinyl chloride with vinyl acetate. These may also be usefully combined with the polyester-polyurethane elastomer resins previously described. It is desirable that the binders have molecular weights greater than 20,000, and more preferably greater than 60,000. If desired, binders of this type may be hardened with an agent such as a polyfunctional isocyanate (e.g., 2,4-toluene diisocyanate/trimethylol propane, 3/1); 4,4'-methylene-bis(cyclohexylisocyanate); and the like.

Conventional amounts of other commonly used additives, such as dispersing agents, antistatic agents, and lubricants may be included in the composition. Preferably, nonmagnetic particles with a Moh hardness of 1 to 7, such as zinc oxide, may be included to improve mechanical properties of the tape as described in U.S. Pat. No. 4,568,619.

The chromium dioxide particles, polymeric binder, and other additives are compounded and formed into magnetic tape in conventional fashion. In a typical procedure the binder is dissolved in a suitable solvent, such as cyclohexanone or tetrahydrofuran or a mixture thereof. A slurry of chromium dioxide particles is separately formed in solvent, typically the same solvent system that is used to dissolve the binder, generally with the aid of a dispersing agent such as a long chain alkyl quarternary ammonium salt. The chromium dioxide slurry then is dispersed in the binder solution. Conventional ball-milling equipment, or other mills that use inert media, may be used to advantage to form the dispersion.

Components such as lubricants, crosslinking agents and the like are conveniently added in solution form while the composition is being milled to form a dispersion. When sufficient mixing has occurred that the dispersion has uniform consistency, it is coated onto a flexible substrate, typically a polyester web such as polyethylene terephthalate film. A reverse-roll coating array or a gravure coating head, frequently in conjunction with a smoothing bar, generally will be used for this purpose. Solvent is than removed from the coated film, such as in a drying tunnel, and the film is calendered to compact and smooth the magnetic coating.

Industry practice has been to employ chromium dioxide loadings in the range of 60 to 80 mg/dm$^2$ in order to meet or exceed VHS performance standards. While such tapes may be used in TMD, it has unexpectedly been found that equivalent color video tapes, prerecorded by TMD, are obtained with chromium dioxide loadings as low as 10 mg/dm$^2$. The selected loading generally will not exceed approximately 50 mg/dm$^2$, however, since there are no performance advantages in higher loading and the added mass increases the amount of material that must be heated and cooled in the TMD process. It becomes increasingly difficult to achieve uniform coatings at lower loadings, and equipment limitations may make loadings lower than approximately 15 mg/dm$^2$ impractical.

These loadings correspond to a thickness of dried chromium dioxide lacquer of approximately 1 to 3 microns. Since it becomes increasingly difficult to achieve uniformity as coating thickness decreases, the practitioner may increase the relative portions of binder and diluents in the coating composition in order to increase coating mass to a level that facilitates the coating process. Increasing the quantities of binder and diluents, however, also increases the mass that must be heated in the thermomagnetic duplication process. Accordingly, the coating thickness generally will be less than 4 microns, preferably 1.5 to 2.5 microns.

The tapes may be used to advantage with thermomagnetic duplication equipment described in U.S. Pat. No. 4,631,602, wherein a laser is used to heat the chromium dioxide coating of the copy tape above its Curie temperature (approximately 130° C.). Since the copy tape has substantially less mass than prior art tapes used for color video prerecording, the copy tape makes it possible to increase the duplication speed using a particular laser source, or to decrease laser power, or to achieve a combination of these desirable results. Indeed, duplication speeds in excess of 4 meters per second have been achieved in a modified version of equipment disclosed in U.S. Pat. No. 4,631,602 wherein air pressure was used to maintain intimate contact between the master and copy tapes during the duplication process.

As an unexpected advantage, it has also been found that the improved copy tapes and process are relatively insensitive to dropouts. Heretofore it generally has been thought that a relatively thick coating is needed to mask irregularities in the base film that might contribute significantly to the dropout population. Also, in realtime duplication, using a magnetic recording head, the number of dropouts in the copy tape is the sum of dropouts contained in the master tape (which are faithfully copied), plus dropouts caused by imperfections in the copy tape itself or the copy process (e.g., caused by dust, etc.), plus dropouts created when marginal imperfections of the master and copy tape coincide to form a detectible dropout. In contrast, for reasons that are not completely understood, dropout population of the thermomagnetically duplicated tape of this invention has been consistently lower than that measured on tape bearing the same color images duplicated using conventional magnetic head recording equipment. It also has been found that dropouts on the master tape frequently are not reproduced on the copy tape, even at high speed duplication rates such as 3 meters per second or faster.

The invention will be further illustrated by the following examples. Chromium dioxide employed in the examples is available from E. I. du Pont de Nemours and Company as Grade T-625, or may be prepared by reacting a paste of $CrO_3/Cr_2O_3/H_2O$ with antimony and iron oxide modifiers as described in U.S. Pat. No. 4,045,544; thermally upgrading resulting chromium dioxide powder, that has been dry milled, as described in U.S. Pat. No. 3,529,930; and stabilizing the upgraded powder with aqueous sodium sulfite as described in U.S. Pat. No. 3,512,930.

EXAMPLE 1

Tape Preparation

A. (Control) Chromium dioxide powder was selected that had a coercivity of 625 oersteds as measured by a dc magnetometer (similar in effect to the classic ballistic galvanometer) and 660 oersteds as measured by a Princeton Applied Research vibrating sample magnetometer using a 10 minute sweep cycle with a maximum applied field of 5000 oersteds. The powder had an aspect ratio of approximately 10 and a specific surface area of 30 m$^2$/g. The chromium dioxide powder was mechanically milled in a "Mikropulverizer" hammer mill, Type 2DH, made by the Pulverizing Machinery Division of Mikropul Corp., to break up agglomerates and achieve reasonably uniform particle size. The powder was upgraded at 35° C. for 2 hours in a rotary kiln, cooled, stabilized in aqueous sodium sulfite solution, filtered, washed, repulped in water to form a slurry of 33% solids content, and spray-dried. The powder then was blended with the following ingredients in a 3 gallon vertical bead mill, charged with 0.5 mm glass beads, to prepare a coating composition:

| | |
|---|---|
| Chromium dioxide | 3240 g |
| Zinc oxide (0.11 micron diameter) | 416 g |
| Bis(2-hydroxyethyl)octadecylamine | 51 g |
| Palmitic acid | 39 g |
| Aliphatic phosphate ester (Dextrol OC70. available from Dexter Chemical Co.) | 24 g |
| Estane 5701F1 polyurethane resin, the reaction product of butylene qlycol adipate and methylene-bis(4-phenyl) diisocyanate and 1,4 butanediol, with a Brookfield viscosity of 3-8 Poise (15% solids in THF) and a Shore hardness of 88A, available from B. F. Goodrich Co. | 67 g |
| Isocetyl stearate | 38 g |
| Myristic acid | 19 g |
| Silicone oil (100 stokes) DC200. available from Dow Corning | 0.15 g |
| Isocyanate hardener, the reaction product of 1 mole of trimethylol propane and 3 moles of tolyl 2,4-diisocyanate | 104 g |
| THF | 3675 g |
| Cyclohexanone | 3850 g |

The zinc oxide comprised 10% by volume of the total pigment.

The composition was coated onto a smooth 15 micron polyethylene terephthalate film using a gravure cylinder with a volume of 23.6×10$^9$ cubic micron/sq. inch, calendered, dried and slit to 0.5 inch width. The coating was 2.5 microns thick and had a total coating weight of 79 mg/dm$^2$. The chromium dioxide loading was 57 mg/dm$^2$.

B. The formulation and procedure of Example 1A was repeated, except that two items in the formulation were changed as follows, keeping the pigment/binder ratio constant:

| | |
|---|---|
| Chromium dioxide | 2520 g |
| Zinc oxide | 1247 g |

The zinc oxide comprised 30% by volume of the total pigment. A gravure cylinder with a volume of 16.7×10$^9$ cubic microns/sq. inch was used to apply a coating that was 1.6 microns thick, when dried, on a 15 micron polyethylene terephthalate film. Total coating weight was 52 mg/dm$^2$. Chromium dioxide loading was 28 mg/dm$^2$.

C. The formulation and procedure of Example 1B was repeated again, except that the quantity of zinc oxide was further increased as follows, while the pigment/binder ratio was kept constant:

| | |
|---|---|
| Chromium dioxide | 1800 g |
| Zinc oxide | 2078 g |

The zinc oxide comprised 50% by volume of the total pigment. The same gravure cylinder used in Example 1B was used, applying a coating that was 1.6 microns thick, when dried, on a 15 micron polyethylene terephthalate film. Total coating weight was 52 mg/dm$^2$. Chromium dioxide loading was 20 mg/dm$^2$.

EXAMPLE 2

Thermomagnetic Duplication

Portions of each test tape prepared in Example 1 were recorded by thermomagnetic duplication at a speed of 4.0 m/second using thermomagnetic duplication equipment that employs a laser beam to heat the tape above its Curie temperature. The equipment is described in copending U.S. Application Ser. No. 848,091 filed Apr. 4, 1986, incorporated herein by reference. A mirror master tape was used that had a prerecorded "50% white" RF video signal in one section and a prerecorded pure red chroma video signal in an adjacent section. Other portions of each test tape were recorded in conventional mode on a carefully aligned VHS Panasonic (National) Model SL8200 cassette recorder at the standard tape speed of 2 m/min, along with a standard unrecorded reference tape Ser. No. B022 obtained from Japan Victor Co. Output values were measured as a.c. voltages on a Hewlett-Packard HP400 EL peak-reading voltmeter. Signal-to-noise values were measured by a Shibasoku Model 925D/1 NTSC Color Video Noise Meter. Signals were sensed before the automatic gain control stages in all cases. All values are reported in decibels, relative to the values sensed for the reference tape as recorded and played back in the conventional (realtime) mode, and are shown in Table 1 and Table 2.

TABLE 1

| | Thermomagnetic Duplication (TMD) | | | |
|---|---|---|---|---|
| Sample | Output (RF) | S/N (RF) | Output (Chr) | S/N (Chr) |
| 1A (Control) | 0.5 | 3.1 | 2.7 | 4.4 |
| 1B | −0.4 | 3.0 | 2.4 | 4.2 |
| 1C | −2.1 | 2.0 | 2.3 | 3.8 |

TABLE 2

| | VHS Realtime Duplication | | | |
|---|---|---|---|---|
| Sample | Output (RF) | S/N (RF) | Output (Chr) | S/N (Chr) |
| 1A (Control) | 0.3 | 3.0 | 0.9 | 2.2 |
| 1B | 0.3 | 1.4 | −2.2 | −0.6 |
| 1C | −1.4 | −0.2 | −5.6 | −1.6 |
| JVC Spec | ≧−2 | ≧−2 | −2 ≦ X ≧ 2 | ≧0 |

Sample 1A performed extremely well in both thermomagnetic duplication and conventional realtime recording.

In TMD mode, Sample 1B lost a decibel in RF output, but was otherwise completely equal to Sample 1A. However, in realtime, Sample 1B lost 1.5 dB in RF S/N, and was at the very bottom of the chroma specification in both output and S/N. Sample 1B is marginally serviceable in realtime, but gives excellent performance for TMD copies.

Sample 1C, at 50% dilution and 20 mg $CrO_2/dm^2$ coverage, continues to give excellent TMD performance. Though the RF output is at the lower edge of specification, the high luminance S/N and high chroma output and S/N assure good picture quality. However, this dilute, low-coverage sample is unserviceable in realtime service because of completely unacceptable chroma output and S/N performance. Note that thinner, more concentrated tapes can obviously be made which will have higher RF output, permitting $CrO_2$ loadings as low as 10 $mg/dm^2$.

EXAMPLE 3

Coercivity Effect

Tapes were prepared using the same formulation, milling, and coating procedures described in Example 1. Both Sample 3A and 3B were applied at a total coating coverage of 56 $mg/dm^2$, and had a chromium dioxide loading of 35 $mg/dm^2$. Sample 3A had a coercivity of 550 oersteds and Sample 3B had a coercivity of 700 oersteds, measured by vibrating sample magnetometer. The tapes were duplicated, and output and signal to noise values measured, as described in Example 2. Results are recorded in Table 3.

TABLE 3

| Sample | Thermomagnetic Duplication | | | | VHS Performance | | | |
|---|---|---|---|---|---|---|---|---|
| | Output (RF) | S/N (RF) | Output (Chr) | S/N (Chr) | Output (RF) | S/N (RF) | Output (Chr) | S/N (Chr) |
| 3A | 1.2 | 3.3 | 2.7 | 4.4 | 0.7 | 4.6 | 1.7 | 5.6 |
| 3B | 2.1 | 3.3 | 3.4 | 4.4 | 1.8 | 4.6 | −0.8 | 3.2 |

Although increasing coercivity enhances RF output in TMD, the other values in TMD are essentially unaffected. This is surprising since the realtime VHS performance shows serious degradation in chroma performance at high coercivity as expected.

EXAMPLE 4

Dropouts

Four slave tapes having the specified chromium dioxide loadings had three separate zones of 50% white signal (4.04 Mhz) copies on them from a mirror master tape which itself had been found to have an average dropout (20 dB loss; 15 microseconds) population of 55 per minute. When these tapes were loaded into VHS cassettes and played back on a Panasonic NV8200 VCR, average dropout frequency was measured. At about the same time, other lengths of the same spools of unrecorded tape were loaded into VHS cassettes, recorded conventionally in realtime by the same NV8200 VCR, and then replayed on the same machine to determine their average uncompensated dropout frequencies. The results are shown in Table 4.

TABLE 4

| Tape | TMD Dropouts | | | | Realtime Dropouts | Master + Realtime |
|---|---|---|---|---|---|---|
| | Zone 1 | Zone 2 | Zone 3 | Average | | |
| A (70 $mg/dm^2$) | 22 | 7 | 11 | 13 | 8 | 63 |
| B (45 $mg/dm^2$) | 56 | 45 | 33 | 45 | 32 | 87 |
| C (48 $mg/dm^2$) | 65 | 22 | 33 | 40 | 34 | 89 |
| D (33 $mg/dm^2$) | 54 | 20 | 11 | 28 | 28 | 83 |

In all cases, the average dropouts in tape copied by TMD are not only less than the sum of "mirror master+realtime", but also are actually less than the dropouts in the master tape alone.

I claim:

1. In a process for the thermomagnetic duplication of color video tape wherein the magnetic image contained on a master tape is duplicated on the chromium dioxide magnetic layer of a copy tape by heating the copy tape above its Curie temperature and then cooling the copy tape through its Curie temperature while maintaining intimate contact with the master tape, the improvement wherein the chromium dioxide layer of the copy tape is less than 4 microns in thickness and contains a chromium dioxide loading in the range of approximately 15 to 50 $mg/dm^2$, which chromium dioxide has a coercivity of at least 610 oersteds.

2. The process of claim 1 wherein the tape duplication speed is greater than approximately 3 meters per second.

3. A magnetic tape consisting essentially of a flexible substrate supporting a ferromagnetic chromium dioxide coating less than approximately 4 microns in thickness, which coating contains chromium dioxide having a coercivity of at least 610 oersteds at a loading of approximately 15 to 50 $mg/dm^2$ and bears a magnetic color video image placed thereon by a thermomagnetic duplication process.

* * * * *

UNITED STATES PATENT AND TRADEMARK OFFICE
CERTIFICATE OF CORRECTION

PATENT NO. : 4,907,103

DATED : March 6, 1990

INVENTOR(S) : Dale M. Hiller

It is certified that error appears in the above-identified patent and that said Letters Patent is hereby corrected as shown below:

On the title page, item [54] and in column 1, lines 1-3:

In the title, [54], change "$CNO_2$" to -- $CrO_2$ --.

Signed and Sealed this

Twenty-ninth Day of October, 1991

Attest:

HARRY F. MANBECK, JR.

Attesting Officer

Commissioner of Patents and Trademarks